May 14, 1935. H. S. BAKER 2,001,375
POP SAFETY VALVE
Filed Oct. 22, 1930
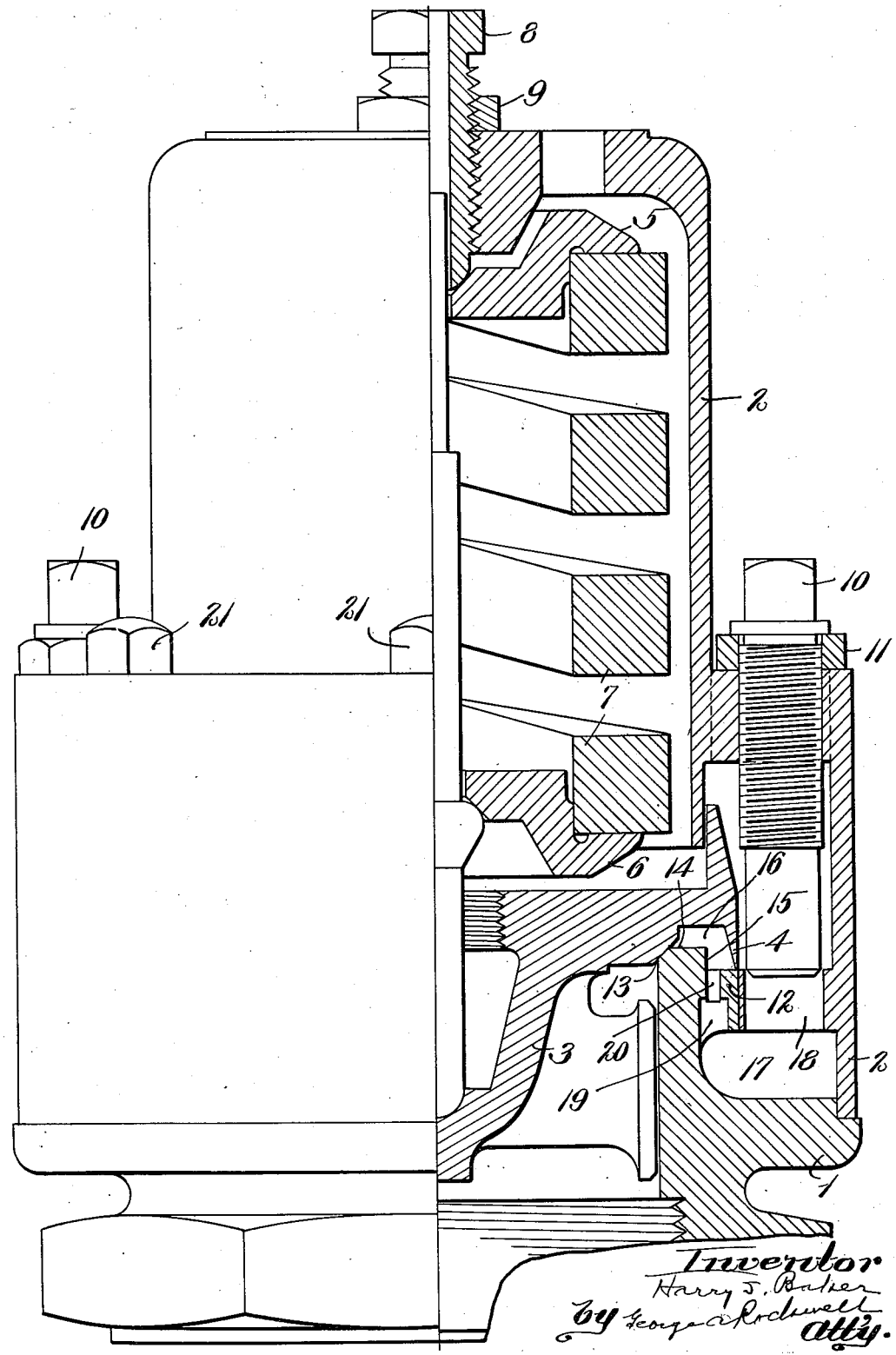
Inventor
Harry S. Baker
by George A. Rockwell
Atty.

Patented May 14, 1935

2,001,375

UNITED STATES PATENT OFFICE 2,001,375

POP SAFETY VALVE

Harry S. Baker, Arlington, Mass., assignor to The Ashton Valve Company, Cambridge, Mass., a corporation of Massachusetts Application October 22, 1930, Serial No. 490,510

5 Claims. (Cl. 137—53)

The principal object of my invention is to provide a pop safety valve having a very substantially larger lift or discharge capacity than prior valves and this with smaller over all dimensions for a given capacity.

A feature of my invention is that the lower edge of the overhanging lip is at least as low as the bottom of the seating line between the upper and lower seats, and preferably this relation is predetermined.

Other features will be pointed out below.

The drawing is an elevation, partly in central section, of a valve embodying my invention.

1 is the base or lower seat of the valve and 2 is the head. Upper seat or wing valve 3 has the annular overhanging lip 4. Between the upper disc 5 and the lower disc 6 is operatively located the spring 7. Pressure screw 8, held by check nut 9, engages disc 5.

The head 2 carries the pop regulators 10 for which check nuts, such as 11, are provided.

The lower edge of lip 4 is adjacent to portion 12 and is lower than the bottom of the seating line between bottom seat 1 and wing valve 3, that is to say, is lower than point 13, which is the bottom of the seating line between members 1 and 3. There is a fixed, predetermined relation between the bottom of lip 4 and portion 12. This relation is fixed at the time of manufacture and is accomplished by machining from the solid casting to certain predetermined dimensions and is not dependent upon the use of a ring or other adjustable member for the setting of these relations.

The surfaces 14 and 15, forming walls of pop chamber 16, are suitably proportioned to give the desired action.

My construction, due to greater use of the kinetic energy of the steam by the sharp change in velocity, gives a greater lift and capacity.

Head bolts 21 secure the head to base 1.

In this type of valve where the blowback is controlled through the supplementary chamber 17, port 18 and regulator 10 my construction permits the making of a valve with smaller over all dimensions for a given capacity.

The pressure in the supplemental chamber 17 is controlled by the regulators and that pressure in turn controls, through conduits 19 and 20, the pressure in chamber 16, which governs the pop or blowback.

The knife edge of lip 4 is preferably about 1/100 of an inch from the top of portion 12 when closed, the inner wall of lip 4 sloping downwardly and outwardly to conduct the steam in its natural line of egress.

The head 2 forms a portion of the wall of the supplementary chamber 17 and carries the pop regulators and furnishes seats for said regulators.

The supplemental chamber 17 provides a chamber in which pressure is accumulated, this chamber being accessible for control by the regulators.

What I claim is:

1. A pop safety valve comprising pop regulators; and a head provided with integral seats for said regulators and carrying said regulators and forming a portion of the wall of a supplementary pop chamber, which portion is integral with said head.

2. A pop safety valve comprising pop regulators; a head provided with integral seats for said regulators and carrying said regulators and forming a portion of the wall of a supplementary pop chamber; a base; and bolts for holding the head to the base.

3. A pop safety valve comprising a head; an upper member having a depending lip forming a wall of a main pop chamber; a lower member upon which the upper member is seated, the bottom of said lip being at least as low as the bottom of the seating line between said two members; a supplementary pop chamber; and pop regulators for controlling the pressure in the supplementary pop chamber; and seats for said regulators, said seats being integral with said head.

4. A pop safety valve comprising a head; an upper member having a depending lip forming a wall of a main pop chamber; a supplemental pop chamber; and a lower member upon which the upper member is seated, the bottom of said lip being at least as low as the bottom of the seating line between said two members, the relation of the bottom of said lip and a cooperating portion of a wall of said main pop chamber being fixed and predetermined, the bottom of said lip being at substantially the same level as the top of said wall, the latter wall being also a wall of said supplemental chamber and forming a passage to direct the flow of steam to said supplemental pop chamber, said wall being integral with said head.

5. A pop safety valve comprising an upper seat; a base; a lower seat on said base and engaging said upper seat; a head bolted to said base; and pop regulators and seats therefor carried by said head, the last-mentioned seats being integral with said head.

HARRY S. BAKER.